United States Patent [19]

Kobayashi et al.

[11] Patent Number: 4,849,022

[45] Date of Patent: Jul. 18, 1989

[54] METHOD FOR MODIFYING THE SURFACE OF FINELY DIVIDED SILICA

[75] Inventors: Hideki Kobayashi; Masayuki Ohnishi, both of Chiba, Japan

[73] Assignee: Toray Silicone Co., Ltd., Tokyo, Japan

[21] Appl. No.: 256,143

[22] Filed: Oct. 11, 1988

Related U.S. Application Data

[63] Continuation of Ser. No. 56,824, Jun. 2, 1987, abandoned.

[30] Foreign Application Priority Data

Jun. 25, 1986 [JP] Japan .................. 61-149254

[51] Int. Cl.$^4$ ................... C08K 9/06; C08K 3/36
[52] U.S. Cl. ......................... 106/490; 524/212; 524/213
[58] Field of Search .................. 523/212, 213; 106/308 G, 308 N, 490

[56] References Cited

U.S. PATENT DOCUMENTS

| | | | |
|---|---|---|---|
| 2,938,009 | 5/1960 | Lucas. | |
| 2,993,809 | 7/1961 | Bueche et al. | 523/213 |
| 3,024,126 | 3/1962 | Brown. | |
| 3,128,196 | 4/1964 | Pierpoint | 523/213 |
| 3,328,339 | 6/1967 | Tierney | 523/213 |
| 3,464,590 | 9/1969 | Wegehaupt et al. | 523/212 |
| 3,635,743 | 1/1972 | Smith. | |
| 3,847,848 | 11/1974 | Beers. | |
| 3,876,605 | 4/1975 | Itoh et al. | 523/212 |
| 4,208,316 | 6/1980 | Nauroth et al. | 106/308 Q |

Primary Examiner—Lewis T. Jacobs
Attorney, Agent, or Firm—Edward C. Elliott

[57] ABSTRACT

In the present invention, finely divided silica is treated with two types of organosilican compounds,
(i) organosilicon compound having the general formula

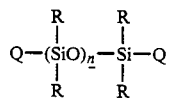

wherein R is a monovalent hydrocarbon group; n is an integer having a value of 0 to 10; and Q is an alkoxy group, halogen atom, or hydroxyl group, and
(ii) organosilicon compound having the general formula

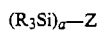

wherein R is a monovalent hydrocarbon group; a is 1 or 2; when a equals 1, Z is a hydrogen atom, halogen atom, hydroxyl group, alkoxy group, —NR$^1{}_2$, —ONR$^1{}_2$, or —OCOR$^1$; when a equals 2, Z is —O— or —NR$^1$—; and R$^1$ is the hydrogen atom or an alkyl group.

The present invention characteristically affords a finely divided silica which has a high degree of surface treatment, which provides an elevated thixotropy when mixed with organopolysiloxane, and which provides stability in long-term storage.

11 Claims, No Drawings

METHOD FOR MODIFYING THE SURFACE OF FINELY DIVIDED SILICA

This is a continuation of application Ser. No. 056,824 filed on June 2, 1987, now abandoned.

BACKGROUND OF THE INVENTION

1. Field of Invention

The present invention relates to a method for modifying the surface of finely divided silica.

2. Background Information

Problems are encountered in the dispersion of those finely divided silicas known as reinforcing fillers for silicone rubber compositions, for example, fumed silica and precipitated silica, into the organopolysiloxane on which such silicone rubber compositions are based. In particular, the silicone rubber composition may suffer from changes in structure or viscosity during storage when an untreated finely divided silica is mixed into the organopolysiloxane, causing a phenomenon known as "crepe hardening."

Methods known in the art for eliminating these problems include treatment of the surface of the finely divided silica with an organosilicon compound, for example, with hexaethyldisilazane (refer to U.S. Pat. No. 3,635,743) or with hexamethylcyclotrisiloxane or octamethylcyclotetrasiloxane (refer to U.S. Pat. No. 2,938,009).

A method of treating reinforcing silica in an organic solvent with an organosilicon compound containing hydroxyl or alkoxy radicals and an amino compound is taught in U.S. Pat. No. 3,024,126, issued Mar. 6, 1962. A specially treated filler is taught in U.S. Pat. No. 3,847,848, issued Nov. 12, 1974 as being a silica filler containing moieties selected from hydroxyl groups, water, and mixtures thereof with hydroxyl amine, cyclic siloxane, and silyl nitrogen compound.

Another method is known in which hydrophobic silica filler is synthesized directly from alkyl silicate and a hydrophobicizing organosilicon compound (refer to Japanese Kohyo Koho Publn. 57-500438).

However, those methods in which the surface of finely divided silica is treated with the above organosilicon compounds suffer from the problem of low thixotropy, or even the absence of any appearance of thixotropy, on the part of the mixture with organopolysiloxane when a high degree of treatment and an organopolysiloxane composition with long-term storage stability without "crepe hardening" are sought.

At the same time, at low degrees of treatment of the surface of the finely divided silica, while the mixture with organopolysiloxane will be thixotropic, the long-term storage stability will be unsatisfactory.

As a result, no method for the treatment of finely divided silica has heretofore been available which would provide a high degree of surface treatment of the finely divided silica and which would impart both thixotropy and long-term storage stability when the silica is compounded as an organopolysiloxane composition.

The method for synthesizing hydrophobic silica filler disclosed in Japanese Kohyo Koho Publn. No. 57-500438 consists of a synthesis from alkyl silicate, but is not a method for treating finely divided silica. In addition, said method requires large quantities of alcohol in order to react the silicate, water and hydrophobicizing organosilicon compound in the liquid phase, and this alcohol must be removed in a subsequent process. As a consequence, said method suffers from the problem of complexity.

SUMMARY OF THE INVENTION

In the present invention, finely divided silica is treated with two types of organosilicone compound; one is an oligomer having alkoxy, halogen, or hydroxyl endblocking, and the other is a trihydrocarbonyl silane or disilane with functional groups which react with hydroxyl groups on silica, and the unreacted functional groups on the oligomer.

The object of the present invention is to eliminate the aforesaid problems by providing a method for modifying the surface of finely divided silica in which the surface will be treated to a high degree, by which a high thixotropy will be obtained for the mixture with organopolysiloxane, and which will provide an excellent storage stability.

DESCRIPTION OF THE INVENTION

The aforesaid object of the present invention can be accomplished by a method for modifying the surface of finely divided silica, which method is characterized in that a finely divided silica having a specific surface area of at least 50 m$^2$/g is treated with both
(i) organosilicon compound having the general formula

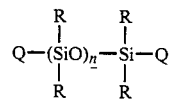

where R is a monovalent hydrocarbon group; n is an integer having a value of 0 to 10; and Q is an alkoxy group, halogen atom, or hydroxyl group, and
(ii) organosilicon compound having the general formula

where R is a monovalent hydrocarbon group; a is 1 or 2; when a=1, Z is a hydrogen atom, halogen atom, hydroxyl group, alkoxy group, —NR$^1$$_2$, —ONR$^1$$_2$, or —OCOR$^1$; when a=2, Z is —O— or —NR$^1$—; and R$^1$ is the hydrogen atom or an alkyl group.

To explain the preceding, the finely divided silica comprising the material to be treated in the present invention is exemplified by fumed silica, precipitated silica, calcined precipitated silica, calcined diatomaceous earth, and finely divided quartz, and these must have a specific surface area of at least 50 m$^2$/g from the standpoint of surface modification. The finely divided silica preferably contains a small quantity of water rather than being in a completely anhydrous state. The water content is preferably 0.2 to 7 weight percent and more preferably 1 to 4 weight percent based on the weight of the silica dried at 100° C. for 2 hours.

With regard to the organosilicon compound comprising the component (i) operative in the present invention's method of surface modification, at least one of the groups Q in component (i) will react with the surface hydroxyl groups of the finely divided silica in order to impart thixotropy to the mixture with organopolysiloxane. It is to have the following general formula.

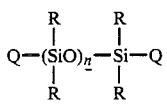

R in the above formula is a monovalent hydrocarbon group, and it is exemplified by alkyl groups such as methyl, ethyl, propyl, butyl, and pentyl; alkenyl groups such as vinyl and propenyl; and aryl groups such as phenyl, tolyl, and xylyl. The groups R in the individual molecule may be identical or different. Q is to be an alkoxy group, halogen atom or hydroxyl group. Said alkoxy groups are exemplified by methoxy, ethoxy, propoxy, methoxyethoxy, and butoxy. The halogen atom is exemplified by chlorine and bromine. The groups Q in the individual molecule may be identical or different. n is an integer having a value of 0 to 10. When n exceeds 10, the proportion of Q within the individual molecule of component (i) becomes so low that a surface modification effect will not appear.

The organosilicon compound comprising the component (ii) operative in the present invention's surface modification method reacts, along with component (i), with the hydroxyl groups on the surface of the finely divided silica, and also acts to provide further modification of the surface of the finely divided silica by reacting with unreacted groups Q of component (i). It is to have the general formula $(R_3Si)_a—Z.$ In the formula, R is a monovalent hydrocarbon group, and it is exemplified as for the groups R of component (i). The groups R in the individual molecule may be identical or different. When a equals 1, Z is to be a hydrogen atom, halogen atom, hydroxyl group, alkoxy group, $-NR^1_2$, $-ONR^1_2$, or $-OCOR^1$. Said halogen atoms and alkoxy groups are exemplified as for component (i). $R^1$ is to be a hydrogen atom or alkyl group, and said alkyl groups are exemplified by methyl, ethyl, propyl, butyl, and pentyl. When a equals 2, Z is $-O-$ or $-NR^1-$.

The use ratio between component (i) and component (ii) is preferably 1:9 to 9:1 as the weight ratio, and more preferably 2:8 to 8:2. With regard to the quantity of finely divided silica in treatment, the total of components (i) and (ii) is preferably 1 to 80 weight parts and more preferably 5 to 60 weight parts per 100 weight parts finely divided silica.

With regard to the method for treating the finely divided silica, the organosilicon compounds comprising components (i) and (ii), as the liquid or gas, are uniformly adhered or adsorbed on the finely divided silica at 0° C. to 200° C. in the air or an inert gas atmosphere, followed by heating at 80° C. to 350° C. and preferably 100° C. to 300° C. The length of time during which components (i) and (ii) are uniformly adhered or adsorbed on the finely divided silica is not specifically restricted, but it is preferably 15 minutes in order to obtain a uniform dispersion. Also, while the length of the heat treatment is not specifically restricted, it is preferably 30 minutes in order to complete the reaction and remove the volatiles.

An organic solvent may be used in the uniform adhesion or adsorption on the finely divided silica. Said organic solvent is exemplified by a single species, or the combination of two or more species, of aromatic hydrocarbon solvent, for example, benzene, toluene, and xylene; chlorinated hydrocarbon solvent, for example, Chlorothene and Tri-Clene; and aliphatic hydrocarbon solvent such as n-hexane and n-heptane.

In addition, a chemical known as a silanol condensation catalyst can be used in the treatment of the finely divided silica with the organosilicon compounds comprising components (i) and (ii). This is exemplified by a single species, or a mixture of two or more species, of ammonium compounds, for example, ammonium hydroxide and ammonium carbonate, and amine compounds, for example, ethylamine, butylamine, diethylamine, dibutylamine, triethylamine, and tributylamine.

Because the finely divided silica produced by the method of the present invention has a high degree of surface modification, it will find utility as a reinforcing filler for thermosetting silicone rubber compositions and room temperature-curing silicone rubber compositions, as a thickener/consistency agent for silicone resins and silicone greases, and as a filler for synthetic rubbers and plastics.

The invention will be illustrated in the following examples. In the examples, parts equal weight parts, percent equals weight percent, and the viscosity is the value measured at 25° C.

EXAMPLE 1

First, 100 parts fumed silica having a specific surface area of 200 m²/g and a water content of 1% was mixed with 10 parts dimethyldimethoxysilane to homogeneity at room temperature in 2 hours.

To this mixture, was added 15 parts hexamethyldisilazane, followed by mixing to homogeneity at room temperature in 1 hour. The mixture was then heated at 150° C. for 3 hours to afford a treated finely divided silica.

In order to quantitate the residual surface silanol on the treated finely divided silica, 2.0 g of the treated silica was dispersed in 25 mL ethanol, and 75 mL 20% aqueous sodium chloride was added. The quantity of 0.1N aqueous sodium hydroxide required for titration was then determined, and these results are reported in Table 1.

A dimethylpolysiloxane composition was prepared by mixing to homogeneity 10 parts of the treated finely divided silica and 100 parts hydroxyl-terminated dimethylpolysiloxane having a viscosity of 100 poise. The obtained composition was allowed to stand at room temperature for 1 day, and the thixotropy was then investigated using a rheopexy analyzer from Iwanoto Seisaku-sho. The cone plate used had a radius of 1.5 cm, and a thixotropic loop was obtained by shearing at a constant rate of increase and decrease of the cone plate from 0 rpm to 40 rpm in a 50 second cycle. The viscosities at an acceleration time corresponding to 3 rpm, at the time corresponding to the maximum of 40 rpm, and their ratio are reported in Table 2. Also reported in Table 2 is the viscosity at 40 rpm of a sample which had stood at room temperature for 3 months.

EXAMPLE 2

A mixture of 8 parts of a hydrolysis condensate of dimethyldichlorosilane with the formula

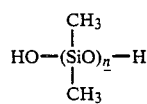

where n was an integer having a value of 2 to 4, 15 parts of trimethylsilanol, 100 parts of the fumed silica as used in Example 1, and 1 part ammonium carbonate were mixed to homogeneity at room temperature over 2 hours. The mixture was then heated for 3 hours at 150° C. to afford a treated finely divided silica.

The residual silanol in this treated finely divided silica was measured by the method described in Example 1, and these results are reported in Table 1. The thixotropy was also measured by the method described in Example 1, and these results are reported in Table 2.

EXAMPLE 3

A mixture of 100 parts fumed silica with a specific surface area of 200 m²/g and a water content of 4%, 10 parts of dimethyldichlorosilane, and 10 parts of trimethylchlorosilane were mixed to homogeneity at room temperature over 2 hours, and this mixture was then heated at 150° C. for 3 hours to afford a treated finely divided silica.

The residual silanol in this treated finely divided silica was measured by the method described in Example 1, and these results are reported in Table 1. The thixotropy was also measured by the method described in Example 1, and these results are reported in Table 2.

EXAMPLE 4

A mixture of 100 parts fumed silica as used in Example 3, 10 parts dimethyldichlorosilane, and 10 parts hexamethyldisiloxane were mixed to homogeneity at room temperature over 2 hours, and this mixture was then heated at 150° C. for 3 hours to afford a treated finely divided silica.

The residual silanol in this treated finely divided silica was measured by the method described in Example 1, and these results are reported in Table 1. The thixotropy was also measured by the method described in Example 1, and these results are reported in Table 2.

EXAMPLE 5

A mixture of 100 parts fumed silica as used in Example 3, 10 parts dimethyldimethoxysilane, 15 parts triethylsilane, and 1.0 part ammonium carbonate were mixed to homogeneity at room temperature, and this mixture was then heated at 150° C. for 3 hours to afford a treated finely divided silica.

The residual silanol in this treated finely divided silica was measured by the method described in Example 1, and these results are reported in Table 1. The thixotropy was also measured by the method described in Example 1, and these results are reported in Table 2.

EXAMPLE 6

A mixture of 100 parts fumed silica as used in Example 3, 15 parts diphenyldimethoxysilane, 15 parts trimethylmethoxysilane, and 1.0 part ammonium carbonate were mixed to homogeneity at room temperature over 1 hour, and this mixture was then heated at 150° C. for 3 hours to afford a treated finely divided silica.

The thixotropy of this treated finely divided silica was measured by the method described in Example 1, and these results are reported in Table 2.

EXAMPLE 7

A mixture of 100 parts fumed silica as used in Example 3, 15 parts methylphenyldiethoxysilane, 15 parts trimethylmethoxysilane, and 15 parts trimethylsilyldiethylamine were mixed to homogeneity at room temperature over 1 hour, and this mixture was then heated at 150° C. for 3 hours to afford a treated finely divided silica.

The thixotropy of this treated finely divided silica was measured by the method described in Example 1, and these results are reported in Table 2.

EXAMPLE 8

A mixture of 100 parts fumed silica as used in Example 3, 10 parts dimethyldimethoxysilane, and 15 parts trimethyldiethylaminoxysilane were mixed to homogeneity at room temperature over 1 hour, and this mixture was then heated at 150° C. for 3 hours to afford a treated finely divided silica.

The thixotropy of this treated finely divided silica was measured by the method described in Example 1, and these results are reported in Table 2.

EXAMPLE 9

A mixture of 100 parts fumed silica as used in Example 3, 10 parts dimethyldihydroxysilane, and 15 parts trimethylacetoxysilane were mixed to homogeneity at room temperature over 1 hour, and this mixture was then heated at 150° C. for 3 hours to afford a treated finely divided silica.

The thixotropy of this treated finely divided silica was measured by the method described in Example 1, and these results are reported in Table 2.

COMPARISON EXAMPLE 1

A fumed silica (Aerosil R972 from Degussa AG), which was hydrophobicized only with dimethyldichlorosilane, was measured for residual silanol as described in Example 1, and these results are reported in Table 1. The thixotropy was also measured by the method of Example 1, and these results are reported in Table 2.

COMPARISON EXAMPLE 2

A fumed silica (Aerosil R811 from Degussa AG), which was hydrophobicized with only hexamethyldisilazane, was measured for residual silanol according to the method of Example 1. The thixotropy was also measured as described in Example 1, and these results are reported in Table 2.

TABLE 1

| value measured: mL of 0.1 N aqueous sodium hydroxide required for measurement of residual silanol | |
|---|---|
| Examples | |
| 1 | 0.5 |
| 2 | 0.4 |
| 3 | 0.7 |
| 4 | 0.7 |
| 5 | 0.8 |
| Comparison Examples | |
| 1 | 1.2 |
| 2 | 1.4 |

TABLE 2

| | Properties | | | |
|---|---|---|---|---|
| | viscosity (poise) | | viscosity ratio | viscosity in poise at 40 rpm after 3 month |
| Examples | 3 rpm | 40 rpm | | |
| 1 | 870 | 250 | 3.5 | 360 |
| 2 | 900 | 260 | 3.5 | 400 |
| 3 | 900 | 300 | 3.0 | 600 |

TABLE 2-continued

| | Properties | | | |
|---|---|---|---|---|
| | viscosity (poise) | | viscosity ratio | viscosity in poise at 40 rpm after 3 month |
| Examples | 3 rpm | 40 rpm | | |
| 4 | 920 | 310 | 3.0 | 620 |
| 5 | 880 | 260 | 3.4 | 500 |
| 6 | 1150 | 390 | 4.0 | 610 |
| 7 | 910 | 310 | 2.9 | 510 |
| 8 | 880 | 290 | 3.0 | 580 |
| 9 | 900 | 290 | 3.1 | 620 |
| Comparison Examples | | | | |
| 1 | 950 | 300 | 3.2 | gelation, measurement not possible |
| 2 | 600 | 250 | 2.4 | 560 |

That which is claimed is:

1. A method for modifying the surface of finely divided silica, which method is characterized in that a finely divided silica having a specific surface area of at least 50 m²/g is treated with both (i) organosilicon compound having the general formula

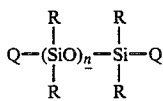

wherein R is a monovalent hydrocarbon group; n is an integer having a value of 0 to 10; and Q is an alkoxy group, halogen atom, or hydroxyl group, and (ii) organosilicon compound having the general formula

wherein R is a monovalent hydrocarbon group; a is 1 or 2; when a equals 1, Z is a hydrogen atom, halogen atom, hydroxyl group, alkoxy group, $-NR^1_2$, $-ONR^1_2$, or $-OCOR^1$; when a equals 2, Z is $-O-$ or $-NR^1-$; and $R^1$ is the hydrogen atom or an alkyl group, said silica having a water content of from 0.2 to 7 weight percent.

2. The method of claim 1 in which the ratio of component (i) to component (ii) is from 1:9 to 9:1.

3. The method of claim 2 in which the total amount of component (i) and (ii) is from 1 to 80 weight parts per 100 weight parts of the finely divided silica.

4. The method of claim 1 in which the treated finely divided silica is further heated at 80° C. to 350° C.

5. The method of claim 3 in which the treated finely divided silica is further heated at 80° C. to 350° C.

6. The treated silica produced by modifying the surface of finely divided silica, which method is characterized in that a finely divided silica having a specific surface area of at least 50 m²/g is treated with both (i) organosilicon compound having the general formula

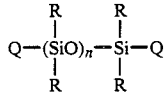

wherein R is a monovalent hydrocarbon group; n is an integer having a value of 0 to 10; and Q is an alkoxy group, halogen atom, or hydroxyl group, and (ii) organosilicon compound having the general formula

wherein R is a monovalent hydrocarbon group; a is 1 or 2; when a equals 1, Z is a hydrogen atom, halogen atom, hydroxyl group, alkoxy group, $-NR^1_2$, $-ONR^1_2$, or $-OCOR^1$; when a equals 2, Z is $-O-$ or $-NR^1-$; and $R^1$ is the hydrogen atom or an alkyl group, said silica having a water content of from 0.2 to 7 weight percent.

7. The treated silica produced by the method of claim 6 in which the ratio of component (i) to component (ii) is from 1:9 to 9:1, the total amount of component (i) and (ii) is from 1 to 80 weight parts per 100 weight parts of the finely divided silica, and the treated finely divided silica is further heated at 80° C. to 350° C.

8. A method for modifying the surface of finely divided silica having a specific surface area of at least 50 m²/g consisting of treating the silica with both (i) organosilicon compound having the general formula

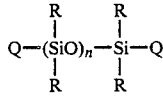

wherein R is a monovalent hydrocarbon group; n is an integer having a value of 0 to 10; and Q is an alkoxy group, halogen atom, or hydroxyl group, and (ii) organosilicon compound having the general formula

wherein R is a monovalent hydrocarbon group; a is 1 or 2; when a equals 1, Z is a hydrogen atom, halogen atom, hydroxyl group, alkoxy group, $-NR^1_2$, $-ONR^1_2$, or $-OCOR^1$; when a equals 2, Z is $-O-$ or $-NR^1-$; and $R^1$ is the hydrogen atom or an alkyl group, said silica having a water content of from 0.2 to 7 weight percent.

9. The method of claim 8 in which the treatment is catalyzed by the addition of a silanol condensation catalyst of the group consisting of ammonium compounds, amine compounds, and mixtures of two or more members of the group.

10. The method of claim 8 in which the ratio of component (i) to component (ii) is from 1:9 to 9:1, the total amount of component (i) and (ii) is from 1 to 80 weight parts per 100 weight parts of the finely divided silica, and the treated finely divided silica is further heated at 80° C. to 350° C.

11. The method of claim 9 in which the ratio of component (i) to component (ii) is from 1:9 to 9:1, the total amount of component (i) and (ii) is from 1 to 80 weight parts per 100 weight parts of the finely divided silica, and the treated finely divided silica is further heated at 80° C. to 350° C.

* * * * *